US012630423B2

(12) United States Patent
Lessle

(10) Patent No.: US 12,630,423 B2
(45) Date of Patent: May 19, 2026

(54) OZONISER AND METHOD FOR PRODUCING OZONE FROM OXYGEN

(71) Applicant: ProMinent GmbH, Heidelberg (DE)

(72) Inventor: Thomas Lessle, Karlsruhe (DE)

(73) Assignee: PROMINENT GMBH, Heidelberg (DE)

( * ) Notice: Subject to any disclaimer, the term of this patent is extended or adjusted under 35 U.S.C. 154(b) by 966 days.

(21) Appl. No.: 17/744,089

(22) Filed: May 13, 2022

(65) Prior Publication Data

US 2022/0371889 A1 Nov. 24, 2022

(30) Foreign Application Priority Data

May 19, 2021 (DE) ..................... 10 2021 113 006.9

(51) Int. Cl.
*C01B 13/11* (2006.01)
(52) U.S. Cl.
CPC .......... *C01B 13/11* (2013.01); *C01B 2201/34* (2013.01); *C01B 2201/64* (2013.01); *C01B 2201/76* (2013.01)
(58) Field of Classification Search
CPC . C01B 13/11; C01B 2201/34; C01B 2201/64; C01B 2201/76; C01B 13/115; C01B 2201/32; C01B 2201/24; C01B 2201/14; C01B 2201/22; C01B 2201/12; C01B 13/10; H05H 1/2437; H05H 2242/10; H05H 2245/15; B01J 19/088
See application file for complete search history.

(56) References Cited

U.S. PATENT DOCUMENTS 6,106,788 A 8/2000 Rau et al.
9,067,788 B1 * 6/2015 Spielman ................ C01B 13/10

FOREIGN PATENT DOCUMENTS

DE 2618243 C3 11/1979
DE 9216427 U1 3/1993
EP 0789666 B1 8/1996
GB 1549055 7/1979

OTHER PUBLICATIONS

First Office Action, dated Jul. 2, 2025, Chinese Patent Application No. 202210524138.6, Examiner Wanghui (and English Translation).

* cited by examiner

*Primary Examiner* — Xiuyu Tai
(74) *Attorney, Agent, or Firm* — PAUL & PAUL

(57) ABSTRACT

The present invention relates to an ozoniser comprising a first and a second electrode between which a first dielectric is arranged, wherein between the first dielectric and the first electrode, a gas channel is arranged, through which an oxygen-containing gas can be conveyed, wherein a first cooling-fluid channel is provided, the wall of which is formed at least in sections by the first dielectric or the second electrode. In order to provide an ozoniser that can realize an increased ozone yield compared to the known devices, it is proposed according to the invention that the cooling-fluid channel is filled with a porous material.

20 Claims, 1 Drawing Sheet

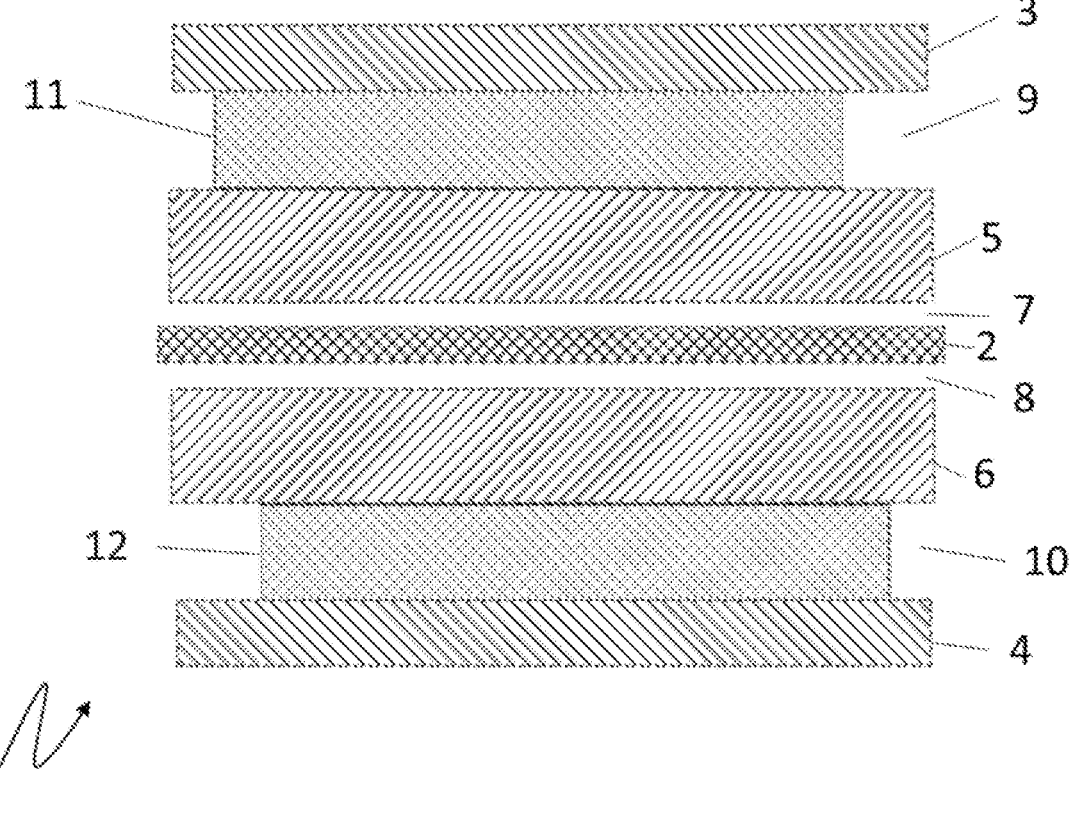

OZONISER AND METHOD FOR PRODUCING OZONE FROM OXYGEN

CROSS-REFERENCE TO RELATED APPLICATION

This application claims the priority of German Application No. 10 2021 113 006.9, filed on May 19, 2021.

The present invention relates to an ozoniser and to a method for producing ozone from oxygen.

An ozoniser is a device for producing ozone from oxygen. Ozone is used as a disinfectant in drinking water purification, for example. Ozone is unstable and therefore only has a limited shelf life. This results in the ozone generally having to be produced directly at the site of intended use.

For example, it is possible to produce ozone in an electrical field. Ozonisers comprising a first and a second electrode, between which a first dielectric is arranged, are used for this purpose. A gas channel, through which an oxygen-containing gas can be conveyed, is arranged between the first dielectric and the first electrode. The gas, which may be ambient air, is conveyed through the gas channel and thus through the electric field generated by the two electrodes. Ozone forms in the electrical field.

With these ozonisers, generally less than one fifth of the electrical energy is integrated into the chemical bond of the ozone. More than 80% of the energy generated is in the form of heat.

This leads to a significant increase in the temperature of the gas that is conveyed through the gas channel. Unfortunately, the stability of ozone is highly temperature-dependent and the higher the temperature of the ozone is, the faster the ozone decomposes back into oxygen. In order to increase the ozone yield of the ozoniser, it is therefore necessary to cool the ozoniser.

It is already common to provide a first cooling-fluid channel, the wall of which is formed at least in sections by the first dielectric or the second electrode. A cooling fluid, such as water, serving as a heat carrier is then conveyed through the cooling-fluid channel so that the cooling fluid cools the surface of the first dielectric or the surface of the second electrode. Since the cooling-fluid channel and the gas channel are separated from one another at least by the dielectric, the heat must be dissipated via the dielectric.

The known ozonisers are often cylindrical, i.e., the electrodes and the dielectric as well as the gas and fluid channels are hollow cylindrical and are arranged coaxially with one another. However, planar arrangements are also known.

In the known ozonisers, the coolant flow rate is in the range between 1.3 and 2 L/g $O_3$. This achieves Reynolds numbers of the coolant flow that are well below the critical value so that the flow type is always laminar at least at the surface to be cooled within the cooling-fluid channel. In a laminar flow, the fluid moves in parallel layers. Heat transfer between the layers is thus carried out only via heat conduction. With a laminar flow, only low heat transport can therefore be realized. Furthermore, in the case of the known ozonisers in which the coolant has direct contact to the dielectric, it is necessary for the heat carrier to have a certain electrical conductivity, which limits the selection of heat carriers. In the case of ozonisers that insert an electrode between dielectric and cooling water, the electrode is made of high-alloyed stainless steel. Stainless steel, however, has a low thermal conductivity so that the situation in the case of such ozonisers is even worse.

With the known ozonisers, it is not possible to significantly increase the Reynolds number so that the flow becomes turbulent. Moreover, this would result in unacceptable water consumption. In addition, the commonly used liquid heat carriers, such as water, themselves have rather poor thermal conductivity, which limits the overall ozone yield of the ozoniser.

Starting from the described prior art, it is therefore the object of the present invention to provide an ozoniser that can realize an increased ozone yield compared to the known devices.

According to the invention, this object is achieved in that the cooling-fluid channel is filled with a porous material. The porous material provides a plurality of channels through which the cooling fluid, such as water, can be conveyed, whereby it is ensured that not only the portion of the cooling fluid that is in direct contact with the dielectric in a laminar flow but also nearly the entire cooling-fluid flow participates in the heat transport. The porous structure itself also participates in the heat transport.

In a preferred embodiment, it is provided that the cooling-fluid channel is provided for the flow of cooling liquid and in particular cooling water. It is advantageous if the cooling fluid does not contain oxygen in gaseous form.

Preferably, the porous material is a porous body. The porous body can take on a support function and can be in contact with both the dielectric and the second electrode in order to maintain a constant distance between the dielectric and the second electrode. This is in particular advantageous in the case of high gas pressures in the gas channel.

In a preferred embodiment, it is provided that the porous material is electrically conductive. In order to increase the electrical field in the gas channel, it is advantageous if the heat carrier is also electrically conductive. However, this is not necessary if the porous material arranged in the cooling-fluid channel is electrically conductive. For example, a porous metal may be used here.

In a further, preferred embodiment, the porous material has a thermal conductivity greater than 10 W/mK, preferably greater than 30 W/mK. Due to the high thermal conductivity, which is significantly greater than the thermal conductivity of most liquid heat carriers, the heat is dissipated faster and more efficiently from the dielectric or the second electrode. This too ensures that the entire cooling fluid participates in the heat transport since cooling-fluid components that flow through the porous material at a location that is relatively far away from the dielectric also impinge on porous material having increased temperature. In a further, preferred embodiment, the porous material has a thermal conductivity between 30 and 50 W/mK.

Particularly preferably, the porous material is an open-pore material so that the fluid in the cooling-fluid channel can flow through the porous material via many paths connected to one another. In a preferred embodiment, the porous material has a volume porosity greater than 25%, preferably greater than 50%, and particularly preferably in the range between 55 and 65%. This ensures that the pressure loss of the heat carrier in the ozoniser does not become too large. Furthermore, it is advantageous if the size of the pores is between 0.5 and 5 mm.

In a preferred embodiment, the cooling-fluid channel has an inlet and an outlet, wherein the inlet and the outlet and the porous material are designed in such a way that a fluid can be conveyed from the inlet through the porous material to the outlet, wherein the inlet and the outlet and the porous material are preferably designed such that a liquid can be conveyed from the inlet through the porous material to the outlet.

Furthermore, it is advantageous for the ozoniser to have a substantially planar sandwich structure, wherein the dielectric is arranged between the first and the second electrode.

In principle, it is advantageous if the sandwich structure is completely planar, even if minor deviations or even small steps do not change the success according to the invention. For example, the two electrodes may be plate-shaped, with the dielectric arranged between the plates so that the gas channel forms on one side of the dielectric and the cooling-fluid channel forms on the other side. The porous material can then likewise be plate-shaped or cuboidal and arranged, for example, between the dielectric and the second electrode so that it is in contact with both the second electrode and the dielectric.

In order to further increase the yield of the ozoniser, it is provided in a further embodiment that a third electrode, a second dielectric, a second gas channel, through which an oxygen-containing gas can be conveyed, and a second cooling-fluid channel, the wall of which is formed at least in sections by the second dielectric or the third electrode, are provided, wherein the first electrode is arranged between the second and the third electrode. Essentially, this ozoniser now comprises two gas channels and two fluid channels, wherein the first electrode forms a separate ozoniser both in relation to the second electrode and in relation to the third electrode. Here, too, the second cooling-fluid channel is preferably designed as a cooling-liquid channel.

It is particularly preferred if the dielectric has a high thermal conductivity. For this reason, the first and/or the second dielectric is best a ceramic dielectric, preferably an $Al_2O_3$ or an AlN ceramic.

With regard to the method, the task mentioned above is achieved by a method for producing ozone from oxygen, comprising the steps of:

A) providing an ozoniser as described above,
B) applying an electrical field between the first and the second electrode,
C) conveying an oxygen-containing gas through the gas channel, and
D) conveying a cooling fluid, preferably cooling water, through the cooling channel.

Further advantages, features, and possible applications become apparent from the following description of a preferred embodiment and the associated figures. They show:

FIG. 1 a schematic cross-sectional view of an embodiment of an ozoniser according to the invention.

FIG. 1 shows a schematic cross-sectional view of an embodiment of an ozoniser 1 according to the invention.

The ozoniser 1 is constructed as a sandwich structure and comprises a plurality of planar or plate-shaped elements. The first electrode 2 is shown in the middle. High voltage can be applied between this first electrode 2 and the second electrode 3. A first dielectric 5 is arranged between the first electrode 2 and the second electrode 3 and divides the space remaining between the first electrode 2 and the second electrode 3 into the gas channel 7 and the cooling-fluid channel 9. An oxygen-containing gas is conveyed through the gas channel 7. Due to the voltage applied between the first electrode 2 and the second electrode 3, an electrical field is formed within the gas channel 7 so that the oxygen molecules can be converted to ozone molecules. However, this produces heat so that the first dielectric 5 heats up. The latter is made of a material having a high thermal conductivity, namely, in the example shown, of a ceramic, in particular an $Al_2O_3$ or an AlN ceramic.

On the side of the first dielectric opposite the gas channel 7, the first cooling-fluid channel 9 is arranged. Through it, a cooling fluid, such as water, is conveyed. Arranged within the cooling-fluid channel 9 is a porous material 11, namely a porous metal in the example shown. The porous metal 11 provides an electrical coupling between the first dielectric 5 and the second electrode 3. In addition, the porous metal 11 provides mechanical stability.

The cooling fluid, such as water, can then be conveyed through the cooling-fluid channel 9 in such a way that it is conveyed through the pores of the porous metal 11, whereby heat can be efficiently dissipated from the porous metal.

The ozoniser has a substantially mirror-symmetrical construction, i.e., it has a third electrode 4 as well as a second dielectric 6. The second dielectric 6 is arranged in such a way that it divides the distance between the first electrode 2 below the third electrode 4 into a second gas channel 8 and a second cooling-fluid channel 10, wherein a second porous material 12, namely a porous metal, is arranged in the second cooling-fluid channel 10. If a voltage is now applied between the first electrode 2 on the one hand and the second and third electrodes 3, 4 on the other hand, and an oxygen-containing gas is conveyed through the two gas channels 7 and 8, ozone is formed therein. The corresponding heat generated is transferred via the two dielectrics 5, 6 to the porous materials 11 and 12, through which a corresponding cooling fluid flows, in order to dissipate the heat.

The porous metals can be manufactured easily. For example, an aluminium alloy having a defined pore structure may be used.

By means of the invention, the heat transfer from the discharge zone, i.e., the two gas channels, into the cooling medium, i.e., the cooling liquid conveyed through the pores of the porous material, is significantly improved. As a result, less cooling fluid is needed and the efficiency of the ozoniser is significantly increased at the same time.

The electrical conductivity of the metal structure increases the electrical contact between the surface of the dielectric and the second or third electrode, which are generally connected to earth. As a result, the requirement of a minimum electrical conductivity of the heat carrier can be dispensed with.

The porous metal structure at the same time forms a positive-locking connection to the dielectric, thereby stabilizing the often thin and brittle dielectric. This also allows the gas in the gas channels to be conveyed through the ozoniser at higher pressure without risk of damaging the dielectric due to the high pressure.

LIST OF REFERENCE SIGNS

1 Ozoniser
2 First electrode
3 Second electrode
4 Third electrode
5 Dielectric
6 Second dielectric
7 Gas channel
8 Second gas channel
9 Cooling-fluid channel
10 Second cooling-fluid channel
11 Porous material
12 Second porous material

The invention claimed is:

1. An ozoniser having a stacked planar plate structure, the ozoniser comprising a first electrode and a second electrode between which a first dielectric is arranged, wherein between the first dielectric and the first electrode, a gas channel is arranged, through which an oxygen-containing gas can be conveyed, wherein a first cooling-fluid channel is provided, a first wall of which is formed at least in sections by the first dielectric, characterized in that the cooling-fluid channel is filled with a porous material, the first cooling channel being fluidically separated from the gas channel by the first dielectric, the first cooling channel being located on a side of the dielectric opposite to the gas channel.

2. The ozoniser according to claim 1, characterized in that the porous material is electrically conductive.

3. The ozoniser according to claim 1, characterized in that the porous material has a thermal conductivity greater than 10 W/mK.

4. The ozoniser according to claim 1, characterized in that the porous material is an open-pore material.

5. The ozoniser according to claim 1, characterized in that the cooling-fluid channel has an inlet and an outlet, wherein the inlet and the outlet and the porous material are designed in such a way that a fluid can be conveyed from the inlet through the porous material to the outlet.

6. The ozoniser according to claim 1, characterized in that the ozoniser has a substantially planar sandwich structure, wherein the dielectric is arranged between the first and the second electrode.

7. The ozoniser according to claim 6, characterized in that a third electrode, a second dielectric, a second gas channel, through which an oxygen-containing gas can be conveyed, and a second cooling-fluid channel, the wall of which is formed at least in sections by the second dielectric or the third electrode, are provided, wherein the first electrode is arranged between the second and the third electrode.

8. The ozoniser according to claim 1, characterized in that the first wall and/or a second dielectric is a ceramic dielectric.

9. The ozoniser according to claim 1, characterized in that the porous material has a volume porosity greater than 25%.

10. The ozoniser according to claim 1, characterized in that the cooling-fluid channel is designed as a cooling-liquid channel.

11. The ozoniser according to claim 1, characterized in that the porous material is formed as a porous body.

12. The ozoniser according to claim 2, wherein the porous material is a porous metal.

13. The ozoniser according to claim 3 wherein the porous material has a thermal conductivity greater than 30 W/mK.

14. The ozoniser according to claim 13 wherein the porous material has a thermal conductivity between 30 W/mK and 50 W/mK.

15. The ozoniser according to claim 6 wherein the porous material is substantially cuboidal and arranged between and in contact with the dielectric and the second electrode.

16. The ozoniser according to claim 8 wherein the first and/or the second dielectric is an $Al_2O_3$ or AlN ceramic.

17. The ozoniser according to claim 9 wherein the porous material has a volume porosity greater than 50%.

18. The ozoniser according to claim 17 wherein the porous material has a volume porosity in the range between 55 and 65%.

19. The ozoniser according to claim 11 wherein the porous body functions as a support body and defines the distance between the dielectric and the second electrode.

20. A method of producing ozone from oxygen, comprising the steps of:
   A) providing an ozoniser according to claim 1,
   B) applying an electrical field between the first and the second electrode,
   C) conveying an oxygen-containing gas through the gas channel, and
   D) conveying a cooling fluid through the cooling channel.

* * * * *